Patented Nov. 1, 1949

2,487,034

UNITED STATES PATENT OFFICE 2,487,034

2.8-DIHYDROXYNAPHTHALENE-6-SULFONIC ACID AS THE AZO COMPONENT FOR DIAZOTYPE PRINTS

William H. von Glahn, Loudonville, and Lester N. Stanley, Delmar, N. Y., assignors to General Aniline & Film Corporation, New York, N. Y., a corporation of Delaware No Drawing. Application March 20, 1946, Serial No. 655,900

4 Claims. (Cl. 95—6)

The present invention relates to diazotype prints, to the light-sensitive materials utilized in the production thereof and more particularly to azo components capable of yielding prints of improved blue shade.

It is known that the diazotype process involves treating a base such as paper or the like with a sensitizing composition containing a light-sensitive diazo compound, exposing the treated base through a pattern and subjecting the exposed material to development by means of an alkali in the presence of an azo dye coupling component capable of reacting with the undestroyed diazo compound to produce azo dyestuff images. In one form of the process the sensitizing composition for the base contains the diazo material, the azo coupling component, however, being applied separately at the time of development. However, in the more usual process, generally referred to as the two-component diazotype process, the sensitizing composition for the base contains both the diazo component and the azo coupling component, azo dye formation taking place after exposure of the sensitized material to a pattern by subjecting the exposed material to the action of an alkali, preferably ammonia vapors.

This method has been extensively used for the preparation of prints in sepia tones. Efforts have also been made to employ said method for the formation of the more attractive blue line prints. These efforts, however, have met with limited success. In the first place, there is a dearth of coupling components capable of yielding the desired blue images. In the second place, the few previously proposed for this purpose fail to meet the rather rigid requirements of the diazotype art, particularly with regard to stability to precoupling and oxidation, leading to background darkening and the like.

Thus in U. S. P. 2,196,950 it is suggested that 2.3-dihydroxynaphthalene be utilized as an azo component for the preparation of sensitized elements capable of yielding prints of a blue shade. It has been found, however, that such sensitized papers are insufficiently stable to pre-coupling on storage as to make them commercially valuable. This patent also refers to the possibility of utilizing sulfonated 2.3-dihydroxynaphthalene but emphasizes that the sulfonated component is not even as suitable as the unsulfonated derivative.

Other dihydroxynaphthalenes have been mentioned as azo components for the diazotype process. U. S. P. 1,758,676, for instance, mentions the employment of 2.7-dihydroxynaphthalene but as will be appreciated from a reference to the patent, this compound yields prints of a deep brown tone on a white background. Furthermore, experience has shown that 1.5-dihydroxynaphthalene- and 1.8-dihydroxynaphthalene-4 sulfonic acid are unsuitable for the production of the desired prints either because of their tendency to produce brown dyestuffs on coupling or because of their lack of stability to pre-coupling and oxidation.

Despite the experience encountered by the art in connection with the hydroxynaphthalenes referred to above, we have now ascertained that 2.8-dihydroxynaphthalene-6-sulfonic acid when used as an azo component in the preparation of light-sensitive diazo-type elements, yields prints of improved blue shades, the sensitized elements meeting completely the requirements of the art with regard to stability and the like. The prints obtained from such component are very attractive, with clearly defined images on a clean, white background. Depending upon the particular light-sensitive diazos employed, the prints vary from an attractive dark blue to reddish blue shades. The prints are exceptionally fast to light and have good wash fastness properties. The stability of the light-sensitive materials containing said compound as an azo component is very marked even under accelerated ageing conditions or on prolonged storage prior to use.

It is accordingly an object of the present invention to produce diazotype prints of an improved blue shade while utilizing as the azo component 2.8-dihydroxynaphthalene-6-sulfonic acid.

It is a further object of the present invention to produce diazotype prints which are fast to light and to washing and the dye images of which are clearly defined blue images on a clean, white background.

It is a further object of the present invention to provide two-component light-sensitive diazotype materials in which the azo component is 2.8-dihydroxynaphthalene-6-sulfonic acid.

A further object of the present invention is a method for producing attractive blue diazotype prints by exposing a two-component light-sensitive diazotype material containing 2.8-dihydroxynaphthalene-6-sulfonic acid to a pattern and by developing the exposed material with ammonia vapors.

Other and further important objects of the invention will become apparent as the description proceeds.

The diazo component which is utilized may be any of those generally employed in the diazotype art, such as diazos derived from aminonaphthol sulfonic acids or preferably from N-substituted p-phenylene diamines. The diazos may be utilized as such or in the form of their stabilized double salts such as with zinc chloride, cadmium chloride, tin chloride, or the like, as the fluoro borates, or as the alkyl or aryl sulfonates, such as the methyl, ethyl, propyl, phenyl and the like sulfonates or as the acid sulfates. Examples of diazos which we have found to be eminently suitable are:

2.5.4'-triethoxydiphenyl - 4 - diazonium acid sulfate

The diazos from p-(N-hydroxyethyl-N-methylamino)-aniline
p-(N-hydroxyethyl-N-ethylamino)-aniline
p-Amino-diphenylamine
p-Amino-N-ethyl-o-toluidine
4-diethylamino-o-phenetidine
4-benzoylamino-2.5-diethoxyaniline
p-Diethylaminoaniline
p-Dimethylaminoaniline
p-(N-benzyl-N-ethyl)-aniline
p-Di-(hydroxyethyl)-amino-aniline
p-(N-hydroxyethyl-N-methylamino)-aniline
p-Ethylamino-m-toluidine
p-(N-ethyl-N-hydroxyethylamino)-o-toluidine
4-diethylamino-2-ethoxyaniline
p-Di-(hydroxyethyl)-amino-o-chloro-aniline
p-Ethylaminoaniline
p-Phenylenediamine The azo component, i. e., 2.8-dihydroxynaphthalene-6-sulfonic acid, is a well-known compound and is described in volume II of Beilstein at page 306. Due to the presence in this compound of the hydroxy and sulfonic acid groups, it is readily soluble in water and hence may be applied to the base from an aqueous solution.

The sensitizing compositions may contain in addition to the diazo compound and the azo component, the usual adjuncts such as metal salts designed to intensify the dyestuff image such as aluminum sulfate, titanium ammonium fluoride, nickel sulfate and the like, stabilizing agents such as thiourea, thiosinamine, naphthalene trisulfonic acid and the like, acids designed to retard pre-coupling, such as citric acid, tartaric acid, boric acid and the like, hygroscopic agents such as glycol, glycerine, dextrin and the like. The use of these adjuncts is well known in the art and hence further information with respect thereto is believed to be unnecessary.

The base to which the sensitizing compositions are applied may be a sheet, film or web of any film forming material such as paper, regenerated cellulose, cellulose ethers, such as cellulose ethylether, cellulose esters such as cellulose acetate, cellulose propionate, cellulose acetate-propionate, cellulose butyrate and the like, linear superpolymers such as linear superpolyamides, linear superpolyesters, linear superpolyethers, linear superpolyureas, linear superpolyurethanes and the like.

It is emphasized in U. S. P. 2,196,950, which recommends the employment of 2.3-dihydroxynaphthalene that the derivatives containing sulfo groups give prints the water fastness of which is impaired. It is therefore deemed to be surprising that applicants' compound not only does not have the poor properties of the dihydroxynaphthalenes in general but despite the presence of the sulfonic acid group nevertheless yields prints of the desired fastness properties.

The invention is further illustrated by the accompanying examples, but it is to be realized that the invention is not restricted thereto, as the examples are exemplary rather than limitative.

*Example I*

| | Parts |
|---|---|
| 2.8-dihydroxynaphthalene-6-sulfonic acid | 2.5 |
| N-phenylaniline-p-diazonium acide sulfate | 2.2 |
| Citric acid | 8 |
| Thiourea | 5 |
| and | |
| Zinc chloride | 5 | are dissolved in 100 parts of water. Paper is coated with the above solution to produce a light-sensitive material which is remarkably stable in that it can be stored for a year under atmospheric conditions of temperature and humidity without any sign of pre-coupling or oxidation ensuing. This is evidenced by the production of clearly defined prints with no discoloration in the background when the paper is exposed and developed after the end of a year.

Upon exposing the light sensitive paper to light under a pattern and development of the exposed paper with ammonia vapor in the usual machines, prints are obtained having bright blue images on a clean white background. These prints have great permanency and are fast to both light and washing.

*Example II*

The procedure is the same as in Example I excepting that the diazo of Example I is replaced by 2 parts of N,N-diethylaniline-p-diazo zinc chloride double salt. Upon exposure and development as in Example I, there are obtained prints reddish blue in color on a clean white background.

*Example III*

The procedure is the same as in Example I excepting that the diazo of Example I is replaced by 2 parts of N-methyl-N-hydroxyethylaniline-p-diazo zinc chloride double salt. Upon exposure and development as in Example I, prints of a darker blue shade are obtained.

*Example IV*

The procedure is the same as in Example I excepting that the diazo of Example I is replaced by 2.5 parts of N-ethyl-o-toluidine-p-diazo zinc chloride double salt. Upon exposure and development of the light-sensitive material as in Example I, purplish blue images are obtained on a clean white background.

*Example V*

The procedure is the same as in Example I excepting that there is employed as the diazo, 2.2 parts of 2.5.4'-triethoxy diphenyl-4-diazonium acid sulfate. Exposure and development of the light-sensitive material as in Example I yields purplish blue prints.

*Example VI*

The procedure is the same as in Example I excepting that the diazo thereof is replaced by 2 parts of N-ethyl-N-hydroxyethyl-m-toluidine-p-diazo zinc chloride double salt. Upon exposure and development as in Example I, prints of a purplish-blue shade are obtained.

Various modifications of the invention will occur to persons skilled in the art, and we therefore do not intend to be limited in the patent granted except as necessitated by the following claims.

We claim:
1. The light sensitive diazotype material comprising a base carrying as the light sensitive diazo compound, the diazo of a p-phenylene diamine and as the azo component 2.8-dihydroxynaphthalene-6-sulfonic acid.

2. Light-sensitive diazotype material comprising paper carrying a composition comprising 2.8-dihydroxynaphthalene-6-sulfonic acid and N-phenylaniline-p-diazonium acid sulfate.

3. Light-sensitive diazotype material comprising paper carrying a light-sensitive composition comprising N-ethyl-N-hydroxyethyl-m-toluidine-p-diazo zinc chloride double salt and 2.8-dihydroxynaphthalene-6-sulfonic acid.

4. Light-sensitive diazotype material comprising paper carrying a light-sensitive composition comprising N-methyl-N-hydroxy-ethyl aniline-p-diazo zinc chloride double salt and 2.8-dihydroxynaphthalene-6-sulfonic acid.

WILLIAM H. von GLAHN.
LESTER N. STANLEY.

REFERENCES CITED

The following references are of record in the file of this patent:

UNITED STATES PATENTS

| Number | Name | Date |
|---|---|---|
| 1,816,989 | Schmidt | Aug. 4, 1931 |
| 2,196,950 | Zahn | Apr. 9, 1940 |

FOREIGN PATENTS

| Number | Country | Date |
|---|---|---|
| 7,453 | Great Britain, 1890 | Apr. 18, 1891 |
| 19,810 | Great Britain, 1907 | Apr. 2, 1908 |